(12) United States Patent
Lopez et al.

(10) Patent No.: US 6,464,334 B2
(45) Date of Patent: Oct. 15, 2002

(54) METHOD FOR IMPROVING THE QUALITY OF PRINTING PROCESSES INVOLVING BLACK PIXEL DEPLETION

(75) Inventors: Matthew Grant Lopez, Escondido; Jason R. Arbeiter, Poway; Michael Scott Gray, Encinitas, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/757,363

(22) Filed: Jan. 8, 2001

(65) Prior Publication Data

US 2002/0089565 A1 Jul. 11, 2002

(51) Int. Cl.[7] .................................................. B41J 2/25
(52) U.S. Cl. ............................ 347/43; 347/15; 347/19; 358/1.9
(58) Field of Search ............................. 347/15, 43, 40, 347/12, 19, 9, 23; 358/1.18, 1.9

(56) References Cited

U.S. PATENT DOCUMENTS

| | | | |
|---|---|---|---|
| 5,581,284 A | * 12/1996 | Hermanson | 347/43 |
| 5,706,414 A | 1/1998 | Pritchard | 395/117 |
| 5,992,962 A | 11/1999 | Yen et al. | 347/9 |
| 6,042,211 A | 3/2000 | Hudson et al. | 347/15 |
| 6,128,098 A | * 10/2000 | Kamada et al. | 358/1.8 |
| 6,132,021 A | 10/2000 | Smith et al. | 347/6 |
| 6,302,511 B1 | * 10/2001 | Neese et al. | 347/19 |

* cited by examiner

Primary Examiner—Lamson Nguyen

(57) ABSTRACT

A method for improving the quality of printing processes involving black pixel depletion by printing composite ink in pixel spaces where a black pixel depletion process leaves unfilled pixel spaces. Black pixel depletion data are employed (for example, a depletion mask is inverted) to generate a composite printing mask which designates pixel spaces which are candidates for being filled in with a composite ink. In a preferred embodiment, edge pixels of black fill areas are excluded from the candidate pixels. In a preferred embodiment, the white pixel spaces are filled in by printing a plurality of different colored inks (e.g., cyan/magenta/yellow or cyan/magenta) within these unfilled pixel spaces. In a preferred embodiment, the composite printing mask additionally serves as an under/overprinting (UOP) map.

20 Claims, 6 Drawing Sheets

METHOD FOR IMPROVING THE QUALITY OF PRINTING PROCESSES INVOLVING BLACK PIXEL DEPLETION

BACKGROUND OF THE INVENTION

1. Field of Invention

The present invention relates generally to a method for improving the quality of printing processes involving black pixel depletion and, more specifically, to a method for printing composite ink in white spaces which are identified employing black pixel depletion data.

2. Description of the Related Art

A typical high quality color inkjet printer prints using at least four colors of ink: cyan, magenta, yellow, and black. A common black ink is a pigment-based ink where undissolved particles are suspended in a clear vehicle. Such pigment-based ink creates the darkest black with a minimum of bleed into the paper. Since the paper is typically white, any significant bleeding of the black ink into the paper will noticeably reduce the sharpness of the edges of black text or other black graphics.

For non-black color inks, dye-based inks are very popular. Dye-based inks do not have color particles suspended in solution and thus tend to bleed into the paper more than pigment-based inks. Since the dye-based ink wicks or bleeds into the paper, the dye-based inks dry faster than the pigment-based inks, which effectively pool on the paper surface. Non-black color inks may also be pigment-based.

In order to reduce ink dry time and/or decrease ink usage, "black pixel depletion" processes (to reduce the density consistency of black text and objects) have been employed in thermal inkjet printers—within Hewlett-Packard Thermal Inkjet Technology (HP TIJ) single-pass print modes (in which the pen swaths are not overlapped), depletion masks have been used to identify black pixels targeted for depletion. See, e.g., U.S. Pat. No. 5,706,414 to Pritchard, incorporated herein by reference. With this black pixel depletion, however, there can be observable white pixels, especially if the drop size of the black pen is small, or if the media dot gain is small. Moreover, depletion masks are often arbitrarily matched with under/overprinting (UOP) maps (which are employed for speeding up the drying time of ink or improving its adhesion to a medium). See, e.g., U.S. Pat. No. 6,132,021 to Smith et al., incorporated herein by reference. With this arbitrary matching of the locations of black pixels with UOP pixels, "white spaces" which tend to detract from the print quality of black area fills can still be present. Accordingly, there is a need for a printing method which improves the print quality of printing processes involving black pixel depletion.

SUMMARY OF THE INVENTION

The printing method of the present invention generally involves printing composite ink in pixel spaces where a black pixel depletion process leaves unfilled pixel spaces. Black pixel depletion data are employed (the depletion mask is inverted) to generate a composite printing mask which designates pixel spaces which are candidates for being filled in with a composite ink. In a preferred embodiment, edge pixels of black fill areas are excluded from the candidate pixels. In a preferred embodiment, the white pixel spaces are filled in by printing a plurality of different colored inks (e.g., cyan/magenta/yellow or cyan/magenta) within these unfilled pixel spaces. In a preferred embodiment, the composite printing mask additionally serves as a UOP map.

A method for printing, in accordance with one embodiment of the present invention, includes the steps of: employing pixel depletion data to identify pixel locations; and applying composite ink to a piece of media at the pixel locations. The pixel depletion data are determined, for example, from a depletion mask (or table). According to a preferred method, the pixel locations are determined by inverting a depletion table. According to a preferred method, the pixel locations exclude edge pixel locations. According to a preferred method, the step of applying composite ink comprises sequentially applying different colored inks at the pixel locations to form the composite ink (e.g., black composite ink, composite ink including at least one dye-based ink, composite ink including at least one pigment-based ink, cyan/magenta/yellow composite ink, cyan/magenta composite ink).

A method for printing, in accordance with another embodiment of the present invention, includes the steps of: identifying depleted pixels of a printing pixel-array; and applying a plurality of inks at each location on a piece of media which corresponds to a depleted pixel. According to a preferred method, a depletion mask is employed to identify the depleted pixels. According to a preferred method, the pixel locations are determined by inverting a depletion table. According to a preferred method, the plurality of inks (e.g., at least one dye-based ink, at least one pigment-based ink, a combination of cyan, magenta and yellow inks, a combination of cyan and magenta inks) is applied one at a time at each location which corresponds to a depleted pixel.

A method for printing (with a printer apparatus including at least one carriage-mounted ink cartridge and a controller, the at least one ink cartridge including a plurality of pens configured to eject a first colored ink and a second colored ink, which, in combination, form a composite ink), in accordance with another embodiment of the present invention, includes the steps of: employing the controller to identify pixel locations from pixel depletion data and control the plurality of pens to apply the first colored ink and the second colored ink to a piece of media at the pixel locations to form the composite ink at the pixel locations. The pixel depletion data are determined, for example, from a depletion mask (or table). According to a preferred method, the pixel locations are determined by inverting a depletion table. According to a preferred method, the pixel locations exclude edge pixel locations.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings:

FIG. 4A shows an example of a matrix depletion mask;

FIG. 4B shows an example of a "matched" composite printing map (or table) according to the present invention;

FIG. 4C shows the resulting ink saturation map (from combining the depletion mask of FIG. 4A and the matched composite printing map of FIG. 4B);

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

While the following detailed description relates to inkjet printers, it should be understood that the principles set forth herein apply to printing devices in general, such as copiers, fax machines, scanners and combinations thereof.

Figure 1:
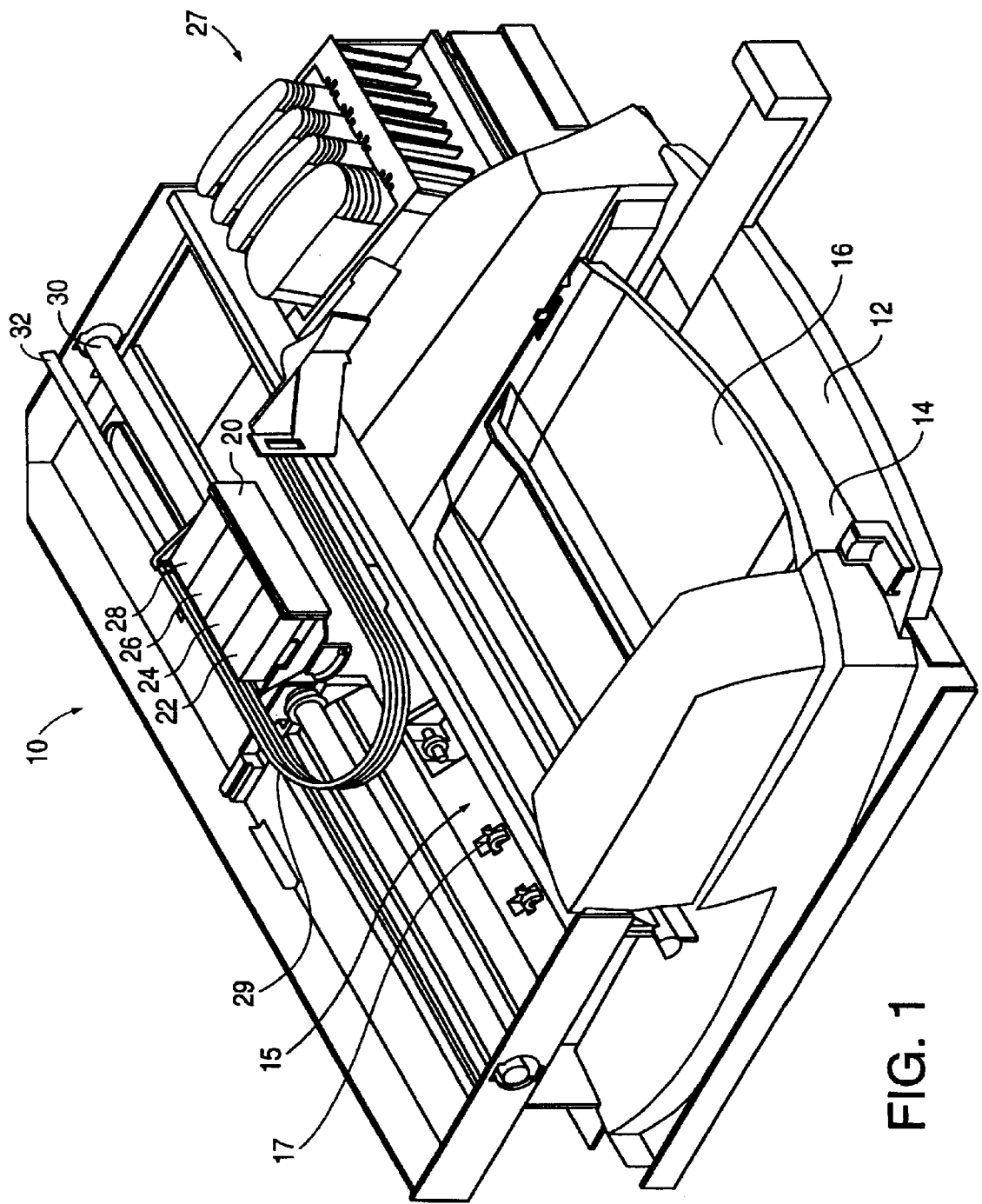
FIG. 1 is a perspective view of one of many examples of an inkjet printer that incorporates the principles of the present invention.

Referring to FIG. 1, an inkjet printer 10 embodying the principles of the present invention is shown. Numerous other inkjet printer designs may also be used while carrying out the present invention. The inkjet printer 10 includes an input tray 12 containing sheets of paper 14 which are forwarded through a print zone 15, using rollers 17, for being printed upon. The paper 14 is then forwarded to an output tray 16. A moveable carriage 20 holds print cartridges 22, 24, 26, and 28, which respectively print cyan (C), black (K), magenta (M), and yellow (Y). These CMY inks are preferably dye-based, but can also be pigment-based. The K ink is preferably pigment-based, but can also be dye-based.

In the illustrated embodiment, inks in replaceable ink cartridges 27 are supplied to their associated print cartridges via flexible ink tubes 29. In this embodiment, the print cartridges preferably are of the type that hold a substantial supply of fluid whether refillable or non-refillable.

In another embodiment, the ink supplies are separate from the print head portions and are removeably mounted on the print heads in the carriage. In this embodiment, the ink supplies are replaceable and the print head is permanent (therefore, it is not necessary to incur the expense of paying to replace an entire pen/ink supply). In a preferred embodiment, the ink supplies are kept small to reduce the mass of the carriage which, in turn, reduces the motor/power requirements, allows for a lower ink supply profile, and reduces the number of parts needed.

In operation, the carriage 20 is moved along a scan axis by a belt and pulley system and slides along a slide rod 30. In another embodiment, the carriage is stationery, and an array of stationary print cartridges print on a moving sheet of paper.

Printing signals from an external computer (e.g., a PC) are processed by the printer 10 to generate a bitmap of the dots to be printed. The bitmap is then converted into firing signals for the print heads. The position of the carriage 20 as it traverses back and forth along the scan axis while printing is determined from an optical encoder strip 32, detected by a photoelectric element on carriage 20, to cause the various ink ejection elements on each print cartridge to be selectively fired at the appropriate time during a carriage scan.

Figure 2:
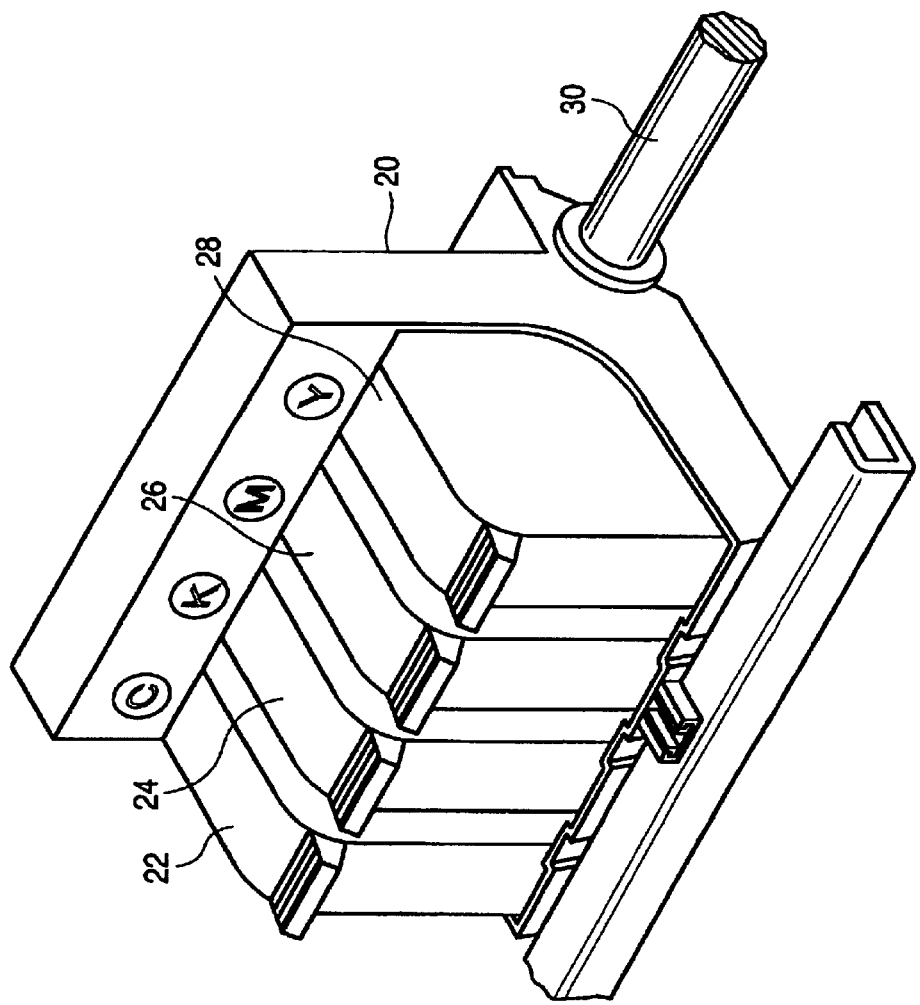
FIG. 2 is a perspective view of the scanning carriage of the printer of FIG. 1 and one possible order for the print cartridges in the carriage.

FIG. 2 illustrates one example of the carriage 20 with the print cartridges 22, 24, 26, and 28 installed in the order of CKMY, as viewed from the front of the printer 10. Carriages with additional cartridges, and different orders (such as KCMY), colors and/or types of ink cartridges, can also be used. Carriages with fixer cartridges can also be used.

As the print cartridges in carriage 20 scan across a sheet of paper, the swaths printed by the print cartridges overlap. After one or more scans, the sheet of paper 14 is shifted in a direction towards the output tray 16 (FIG. 1), and the carriage 20 resumes scanning.

Figure 3:
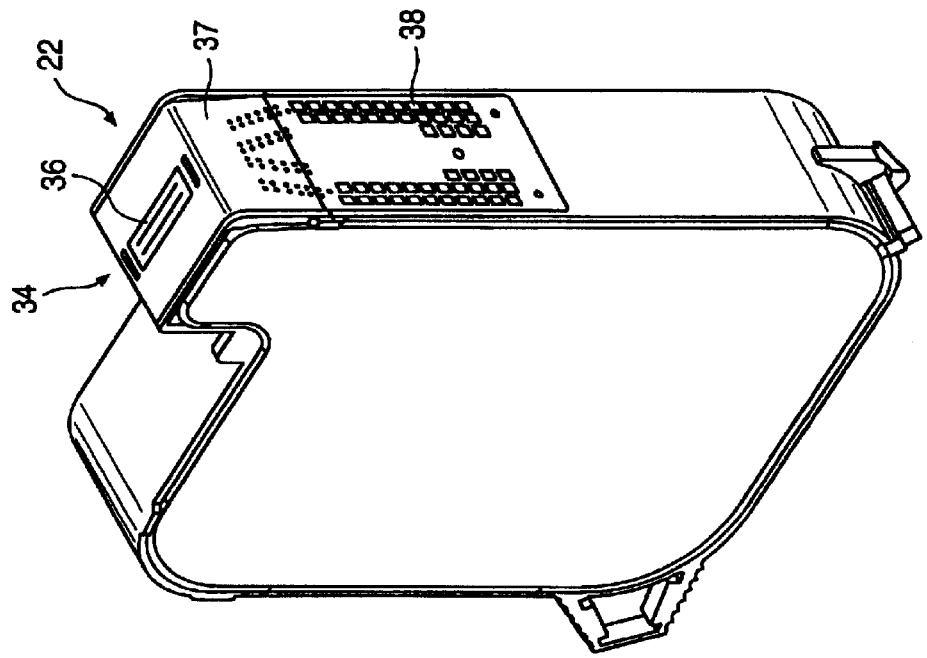
FIG. 3 is a perspective view of one of the print cartridges of FIG. 2.

FIG. 3 shows one example of a print cartridge which may serve as any of the print cartridges in the carriage 20, such as the print cartridge 22. The print cartridge 22 contains a reservoir of ink, or has an ink passage connected to an off-axis ink supply, which is connected to a print head portion 34. The print head portion 34 basically consists of a print head substrate containing ink channels leading to chambers surrounding ink ejection elements. A nozzle plate 36 is positioned over the substrate with each nozzle overlying an ink ejection chamber. In one embodiment, nozzles are formed in a flexible tape (a TAB circuit 37). Contact pads 38 contact electrodes in the carriage 20 and supply electrical signals to the print head substrate via traces on the TAB circuit 37. In another embodiment, the nozzle plate 36 comprises an epoxy or metal. The print head may use resistive, piezoelectric or other types of ink ejection elements.

FIG. 4A shows a 5×5 matrix depletion mask for which "1" indicates pixels that are printed with process (true) black and "0" indicates white pixel space. The illustrated exemplary depletion mask is a 24% depletion mask—six 0's divided by twenty-five (25) pixel spaces.

FIG. 4B shows a 5×5 "matched" composite printing map (or table) according to the present invention. In the illustrated matrix, "1" indicates pixels that are printed with a composite ink (e.g., composite black) and "0" indicates that no composite ink is printed within that pixel space. In the matched composite printing map, at least the pixel spaces which correspond to the depleted (indicated by "0") pixel spaces of FIG. 4A are printed with composite ink. In the example composite printing map of FIG. 4B, the saturation level is 52%—thirteen 1's divided by twenty-five (25) pixel spaces.

FIG. 4C shows the resulting ink saturation map (from combining the depletion mask of FIG. 4A and the matched composite printing map of FIG. 4B). In the illustrated map, "1" indicates pixels which are printed with either process black or composite ink and "2" indicates pixels within which both process black and composite ink were deposited. No pixel space is left unprinted which significantly improves the print quality of black fill areas. In an exemplary preferred embodiment of the present invention, the matched composite printing map (FIG. 4B) eliminates "white spaces" caused by black pixel depletion while simultaneously serving as a UOP map.

It should be understood that the principles of the present invention are applicable to numerous different types of depletion masks and tables including, but not limited to, repeating depletion masks, random depletion masks, and deletion tables such as those disclosed in U.S. Pat. No. 5,706,414 to Pritchard. The present invention is also applicable to depletion matrices of different sizes (e.g., 7×7, 8×8) as well as to depletion tables where the width and height are not equal.

Figure 5:
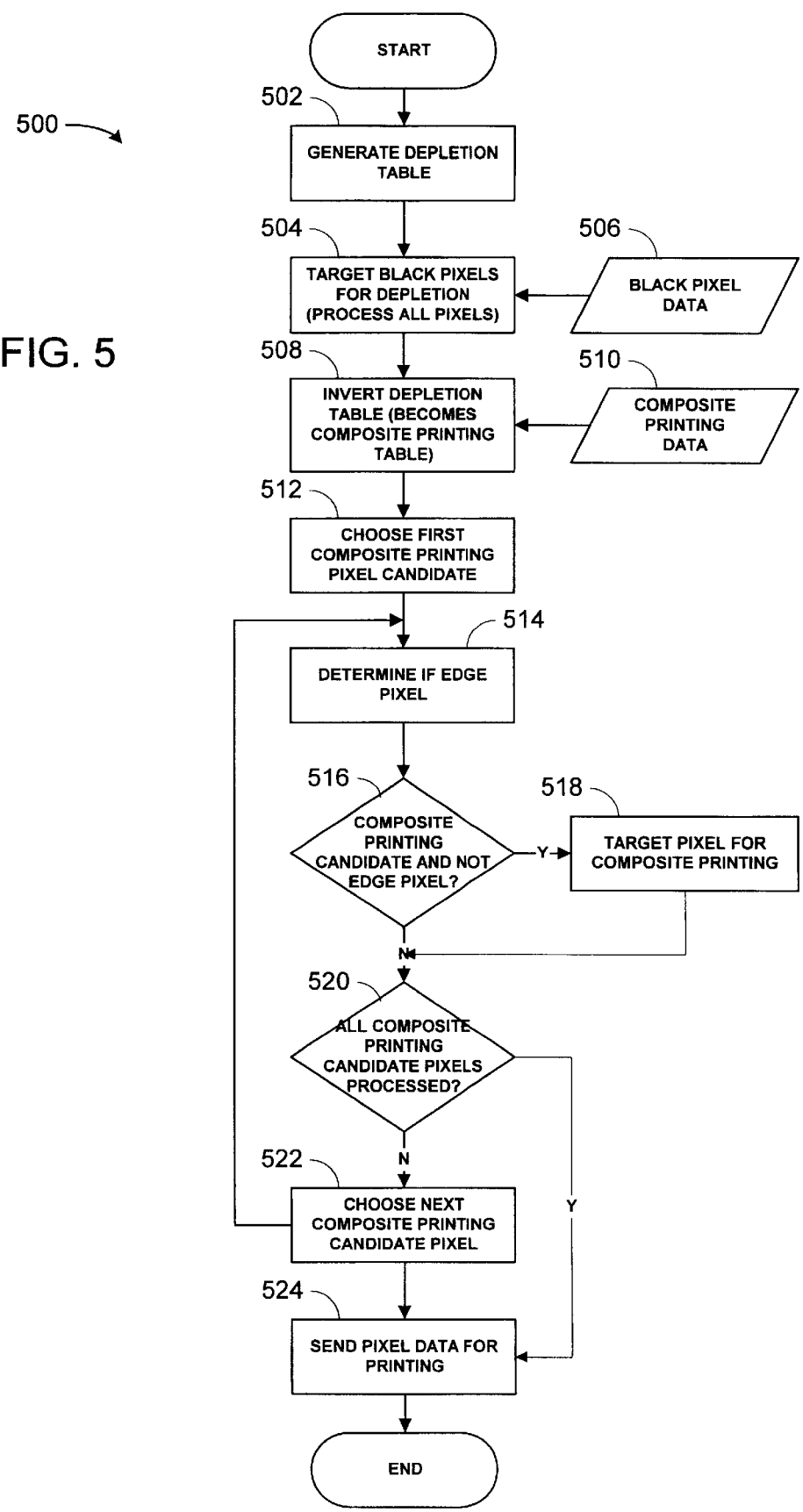
FIG. 5 is a flowchart showing an exemplary preferred method, according to the present invention, for improving the quality of printing processes involving black pixel depletion.

Referring to FIG. 5, an exemplary preferred method for improving the quality of printing processes involving black pixel depletion is shown in the form of a flowchart. An exemplary preferred printing method 500 according to the present invention begins at step 502 with accessing or generating a depletion table (or depletion tables) as discussed above. At step 504, the depletion table is applied to black pixel data 506 to target particular black pixels for depletion.

At step 508, the pixel depletion data are employed to generate the composite printing map. In one embodiment, pixel spaces to be designated for printing with composite ink are the same as the depleted pixel spaces—in other words, the pixel locations (of the composite printing map) designated for printing with composite ink are determined by inverting the depletion table. In a preferred embodiment, the composite printing map is generated in consideration of the composite printing data 510 which include information such designations of groups of different colored inks, and how much of each ink, are to be used to generate the composite ink. In a preferred embodiment, the composite printing data 510 are determined in consideration of factors such as the print quality desired, the amount of particular inks remaining in the cartridges, the type of print media being printed upon, UOP data, or a combination of the above.

According to the printing method 500 illustrated in FIG. 5, the composite printing map (or table) identifies candidate pixels for composite printing. In a preferred embodiment, the edge pixels of black fill areas are not depleted. Therefore, it is generally not necessary or desirable to apply composite ink to such pixels. At step 512, the first composite printing pixel candidate (from the composite printing map) is chosen. At step 514, it is determined whether the composite printing pixel candidate is an edge pixel. If "yes", step 516 redirects processing to step 518 at which the pixel is targeted for composite printing. If "no", step 518 is bypassed. At step 520, it is determined whether all of the composite printing candidate pixels have been processed. If "yes", the processing advances to step 524 at which the pixel data for printing is sent. If "no", the processing advances to step 522 at which the next composite printing candidate pixel is chosen, and steps 514 et. seq. are repeated as discussed above until all of the composite printing candidate pixels have been processed.

In one embodiment, processing and printing occurs on a swath-by-swath basis. However, with sufficient memory and processing power, a greater amount of data, e.g. for an entire page, can be processed and/or printed at the same time. A description of how the printing method of the present invention can be implemented in a bi-directional print mode is set forth below.

Figure 6A:
FIGS. 6A and 6B illustrate how the printing method of the present invention can be implemented in a bi-directional print mode when the carriage scans from left-to-right.
Figure 6B:
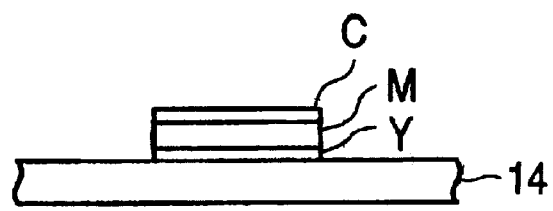
Figure 7A:
FIGS. 7A and 7B illustrate how the printing method of the present invention can be implemented in a bi-directional print mode when the carriage scans from right-to-left.
Figure 7B:
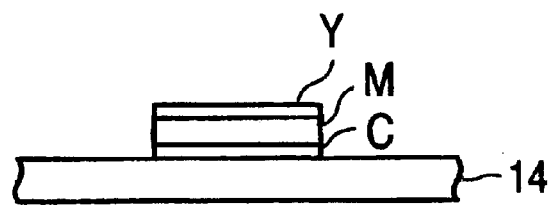

Referring to FIGS. 6A and 6B, when the carriage scans from left-to-right, yellow (Y) ink is deposited on the piece of media 14 and, in the same scan, magenta (M) ink and cyan (C) ink are sequentially deposited thereover creating composite ink. Referring to FIGS. 7A and 7B, in the right-to-left scan direction, cyan (C) ink is deposited on the piece of media 14 and, in the same scan, magenta (M) ink and yellow (Y) ink are sequentially deposited thereover creating composite ink.

In another embodiment, the composite ink is formed from a different plurality of inks, for example, from C and M inks. The C/M composite ink can be used to fill white pixel space all of the time (to save Y ink which tends to be consumed the most) or only when the supply of Y ink is sufficiently low or completely exhausted. In another embodiment, the amount of Y ink is adjustable, e.g., constituting anywhere from 0% to 33% of the composite ink.

In another embodiment, pixel spaces in the composite printing map (or table) can be designed for under/overprinting (UOP) even when those pixel spaces were not depleted. In this embodiment, the C and M inks are used to underprint and overprint the black ink (M), or vice versa. In another embodiment, the printing method includes underprinting (but not overprinting) of the black ink (M). Thus, as noted supra, an exemplary preferred composite printing map eliminates "white spaces" caused by black pixel depletion while simultaneously serving as a UOP map. Depending upon the quantity of color ink required for UOP, different portions of white pixel space can be filled in with the composite ink.

Referring again to FIG. 5, the exemplary preferred printing method 500 shows black pixel data depletion processing occurring prior to the processing steps which identify pixels for composite printing. In an alternative embodiment, provided the depletion mask is available, color underprinting data processing is performed prior to black pixel data depletion processing.

Figure 8:
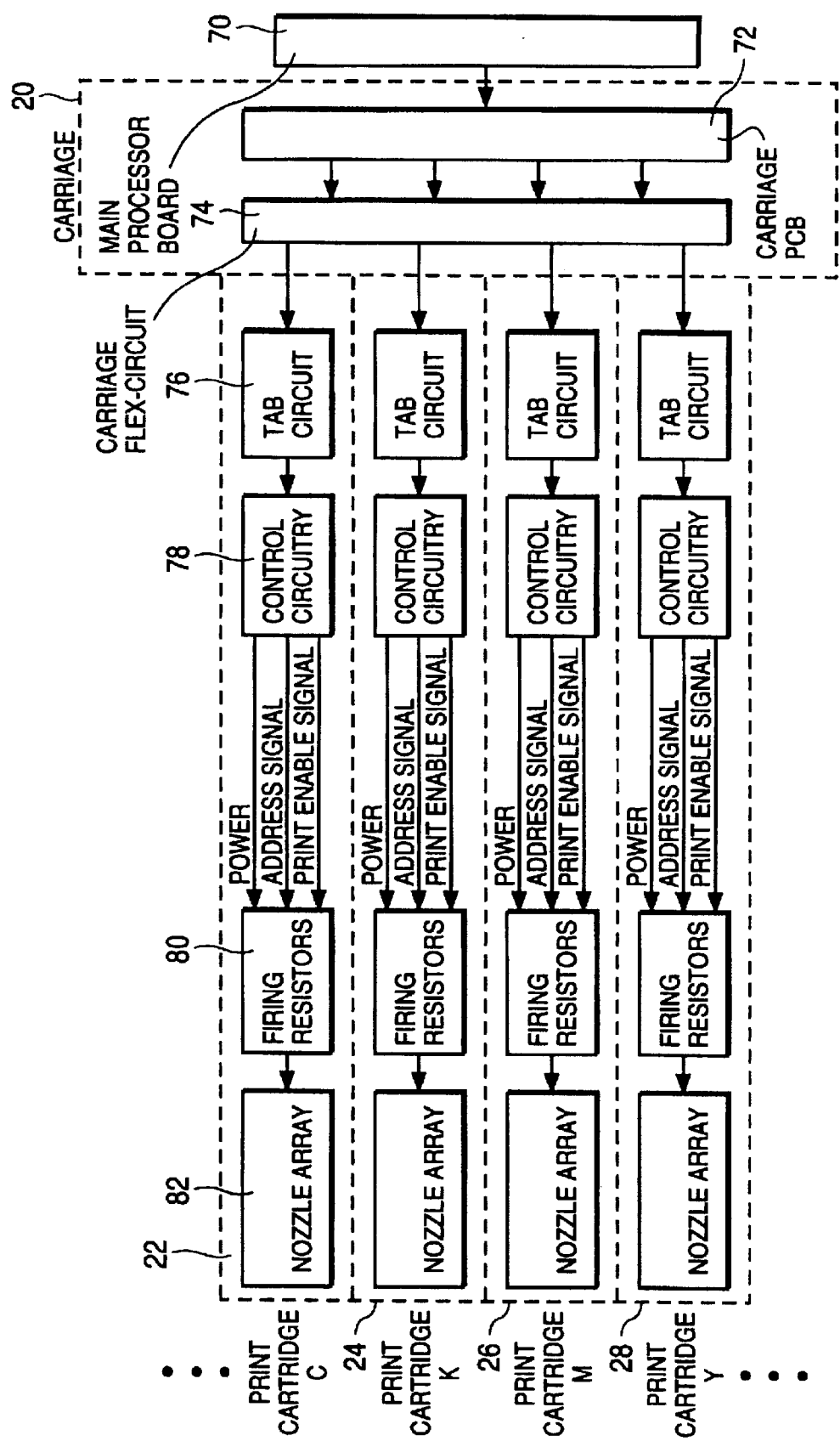
FIG. 8 illustrates electronics within the printer of FIG. 1 for generating energization signals for the fluid ejection elements in the print heads.

FIG. 8 illustrates exemplary circuitry (in the print cartridges, carriage 20 and printer 10) for generating firing signals for heater resistors in the print heads. A main processor board 70 in the printer performs the well known steps of decoding the print signals from a (personal) computer connected to an input of the printer and creating a bitmap of the dots to be printed in a swath buffer forming part of the main processor board 70. The data is transferred to a carriage printed circuit board (PCB) 72, which uses timing signals from the optical encoder strip 32 (FIG. 1) to generate the addressing signals for firing selected heater resistors in a particular print head. A carriage flex circuit 74 contains electrodes for being contacted by the contact pads on a print cartridge TAB circuit 76. A control circuit 78 on the print head distributes the signals to the various heater resistor circuits. Heater (or firing) resistors 80 vaporize a portion of the ink in their associated chambers to expel a droplet of ink through an associated nozzle in a nozzle array 82.

Although the present invention has been described in terms of the preferred embodiment above, numerous modifications and/or additions to the above-described preferred embodiment would be readily apparent to one skilled in the art. It is intended that the scope of the present invention extends to all such modifications and/or additions.

We claim:

1. A method for printing, comprising the steps of:
   determining pixel depletion data from a depletion mask or table;
   employing the pixel depletion data to generate a composite printing mask identifying pixel locations; and
   applying composite ink to a piece of media at the pixel locations.

2. The method for printing of claim 1, wherein the composite printing mask is generated to also serve as an under/overprinting (UOP) map.

3. The method for printing of claim 1, wherein the pixel locations are determined by inverting a depletion table.

4. The method for printing of claim 1, wherein the pixel locations exclude locations of edge pixels of a black fill area.

5. The method for printing of claim 1, wherein the step of applying composite ink comprises sequentially applying different colored inks at the pixel locations to form the composite ink.

6. The method for printing of claim 1, wherein the composite ink is black.

7. The method for printing of claim 1, wherein the composite ink comprises at least one dye-based ink.

8. The method for printing of claim 1, wherein the composite ink comprises at least one pigment-based ink.

9. The method for printing of claim 1, wherein the composite ink comprises cyan ink and magenta ink.

10. The method for printing of claim 9, wherein the composite ink further comprises yellow ink.

11. A method for printing, comprising the steps of:
   employing a depletion mask or table to identify depleted pixels of a printing pixel-array; and
   applying a plurality of inks at each location on a piece of media which corresponds to a depleted pixel.

12. The method for printing of claim 11, wherein different portions of the locations are filled in with the plurality of inks depending upon a quantity of color ink required for an under/overprinting (UOP).

13. The method for printing of claim 11, wherein the pixel locations are determined by inverting a depletion table.

14. The method for printing of claim 11, wherein the plurality of inks is applied one at a time at each location which corresponds to a depleted pixel.

15. The method for printing of claim 11, wherein the plurality of inks comprises at least one dye-based ink.

16. The method for printing of claim 11, wherein the plurality of inks comprises at least one pigment-based ink.

17. The method for printing of claim 11, wherein the plurality of inks comprises cyan ink and magenta ink.

18. The method for printing of claim 17, wherein the plurality of inks further comprises yellow ink.

19. A method for printing, with a printer apparatus including at least one carriage-mounted ink cartridge and a controller, the at least one ink cartridge including a plurality of pens configured to eject a first colored ink and a second colored ink, which, in combination, form a composite ink, the method comprising the step of:
   employing the controller to
      process pixel depletion data to generate a composite printing map identifying pixel locations such that the composite printing map also serves as an under/overprinting (UOP) map and
      control the plurality of pens to apply the first colored ink and the second colored ink to a piece of media at the pixel locations to form the composite ink at the pixel locations.

20. The method for printing of claim 19, wherein the pixel depletion data are determined from a depletion mask or table.

* * * * *